(No Model.)

G. THOMPSON.
KITCHEN CABINET.

No. 511,002. Patented Dec. 19, 1893.

Witnesses:

Inventor
George Thompson
By Higdon & Higdon
Attys.

UNITED STATES PATENT OFFICE.

GEORGE THOMPSON, OF KANSAS CITY, MISSOURI.

KITCHEN-CABINET.

SPECIFICATION forming part of Letters Patent No. 511,002, dated December 19, 1893.

Application filed August 15, 1892. Serial No. 443,088. (No model.)

*To all whom it may concern:*

Be it known that I, GEORGE THOMPSON, of Kansas City, Jackson county, Missouri, have invented certain new and useful Improvements in Kitchen-Cabinets, of which the following is a full, clear, and exact description, reference being had to the accompanying drawings, forming a part hereof.

My invention relates to kitchen cabinets, the object of the same being to provide a device of this character which will be simple and inexpensive of construction and convenient for the purposes it is intended to serve, and with these objects in view, my invention consists in certain details of construction and combination of parts as will be hereinafter more fully described and pointed out in the claim.

Figure 1:
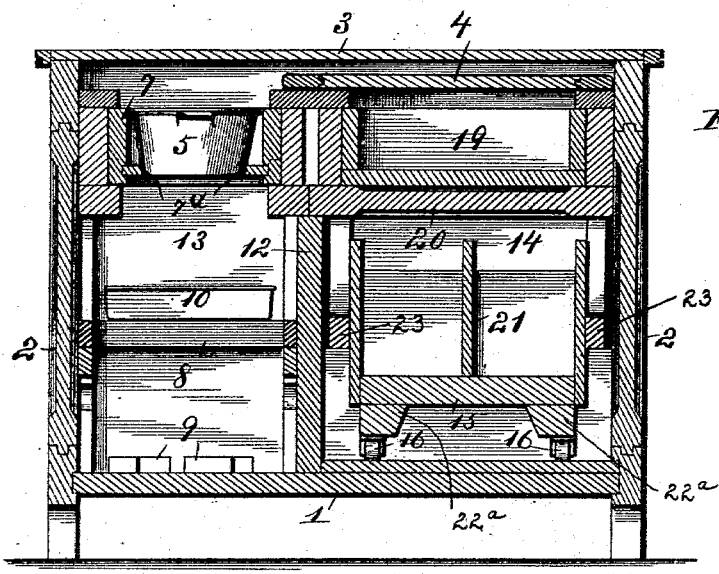
Figure 2:
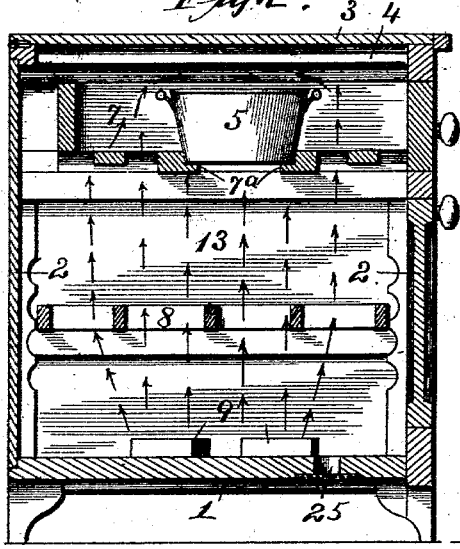
Figure 3:
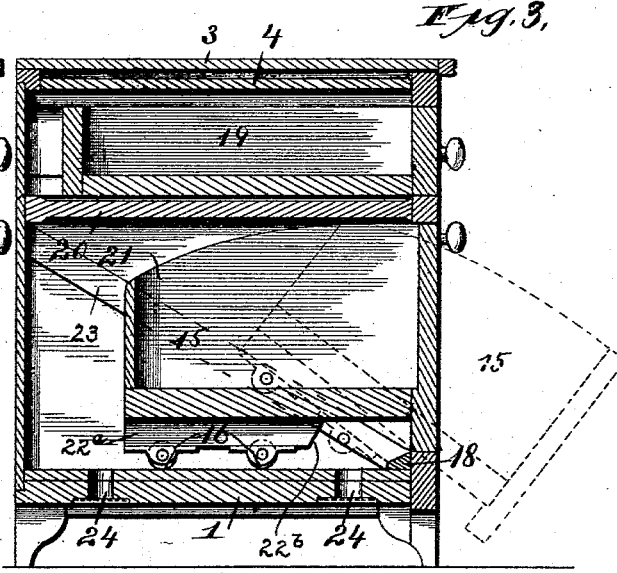

In the accompanying drawings which illustrate my invention, Figure 1, represents a vertical longitudinal sectional view of a kitchen-cabinet, and showing in section therein a bin mounted on rollers. Fig. 2, is a vertical sectional view of the cabinet to show the construction of the slotted drawer, and the drawer supporting the dough-pan. Fig. 3, is a vertical transverse sectional view thereof, and showing the bin in vertical longitudinal section.

The cabinet represented in the drawings is shown as of rectangular form, consisting of the floor 1, the sides and ends 2, and the lid 3 which is adapted to fold back and expose for use a kneading-board 4; said kneading-board being removable when necessary or desirable.

A vertical partition 12 divides the cabinet into two principal compartments 13 and 14, the former of which is divided by an adjustable shelf 8, into an upper compartment and a lower compartment. The upper compartment is occupied by a drawer 7, the bottom of which is formed with an opening 7ª, that receives a pan 5, in which the dough is left to rise after being kneaded on the board 4.

In order that the best results may be obtained, when the dough is left to rise in the pan, it is necessary to maintain the same at a certain temperature which I do by means of bricks 9 that are heated and placed on the floor 1 as shown in Fig. 3, or any other artificial means of heating may be employed. The heat thus generated radiates up through the space between the slats of the adjustable shelf 8 and around the pan as shown by arrows. After the dough has been left a sufficient time to rise, it is then placed on the kneading-board and formed into loaves which are placed in a pan 10 that is left on shelf 8 until ready for baking. The upper portion of compartment 14 is occupied by a drawer 19 which may be employed as a receptacle for cutlery or other articles necessary to a kitchen. This drawer slides on a horizontal partition 20 beneath which is located bin 15, the same being divided into two parts by a vertical partition 21 for receiving flour and meal. Said bin is mounted upon longitudinally arranged blocks or bars 22ª having their forward ends beveled forwardly and upwardly as shown at 22ᵇ and beneath said blocks or bars are suitably secured two pairs of rollers 16. By placing the first pair of rollers near the center of gravity of the bin, it allows the same to tilt when partly withdrawn from its compartment and also facilitates the handling thereof as there is less leverage to overcome than if the bottom of bin were provided with but one pair of rollers located at its extreme rear end. When the bin is in a tilted position as shown by dotted lines in Fig. 5, the top thereof contacts with horizontal partition 20 and the beveled ends of the blocks or bars, carrying the rollers, rest securely upon the beveled upper surface of the stop bar 18 and prevents the bin from being entirely withdrawn from its compartment. However, it may be removed for cleaning, by raising it to a horizontal position as the sloping upper rear portion of the sides will permit it being raised over the stop 18.

23 represents two obliquely arranged strips which act as guides for the bin; they are placed a slight distance from the sides of the compartment in order that the fresh air which passes through ventilating apertures 24, may circulate around the bin and thus preserve its contents. Compartment 13 is also provided with ventilating apertures 25, which admit fresh air to prevent the dough placed therein from becoming sour.

Hinged lid 3 is provided with flanges at its front and sides which render the cabinet dust-proof and also assist in retaining the heat radiating from the hot bricks placed on the floor of compartment 13.

Having thus described my invention, what I claim as new therein, and desire to secure by Letters Patent, is—

In a kitchen cabinet, divided into two compartments, the combination of a tilting bin located in one of said compartments and mounted upon a pair of bars or blocks, extending longitudinally of the bottom of the bin, from the rear end to within a short distance of the front end thereof, and having beveled forward ends, and supported each upon a pair of rollers, with a transverse strip located at the front end of said compartment, and having a beveled upper surface, substantially as and for the purpose set forth.

In testimony whereof I affix my signature in the presence of two witnesses.

GEORGE THOMPSON.

Witnesses:
HARRIET E. PRICE,
CHAS. A. JONES.